Aug. 1, 1933.       R. T. OSMAN       1,920,661
SPRING SUSPENSION
Filed May 29, 1930       2 Sheets-Sheet 1
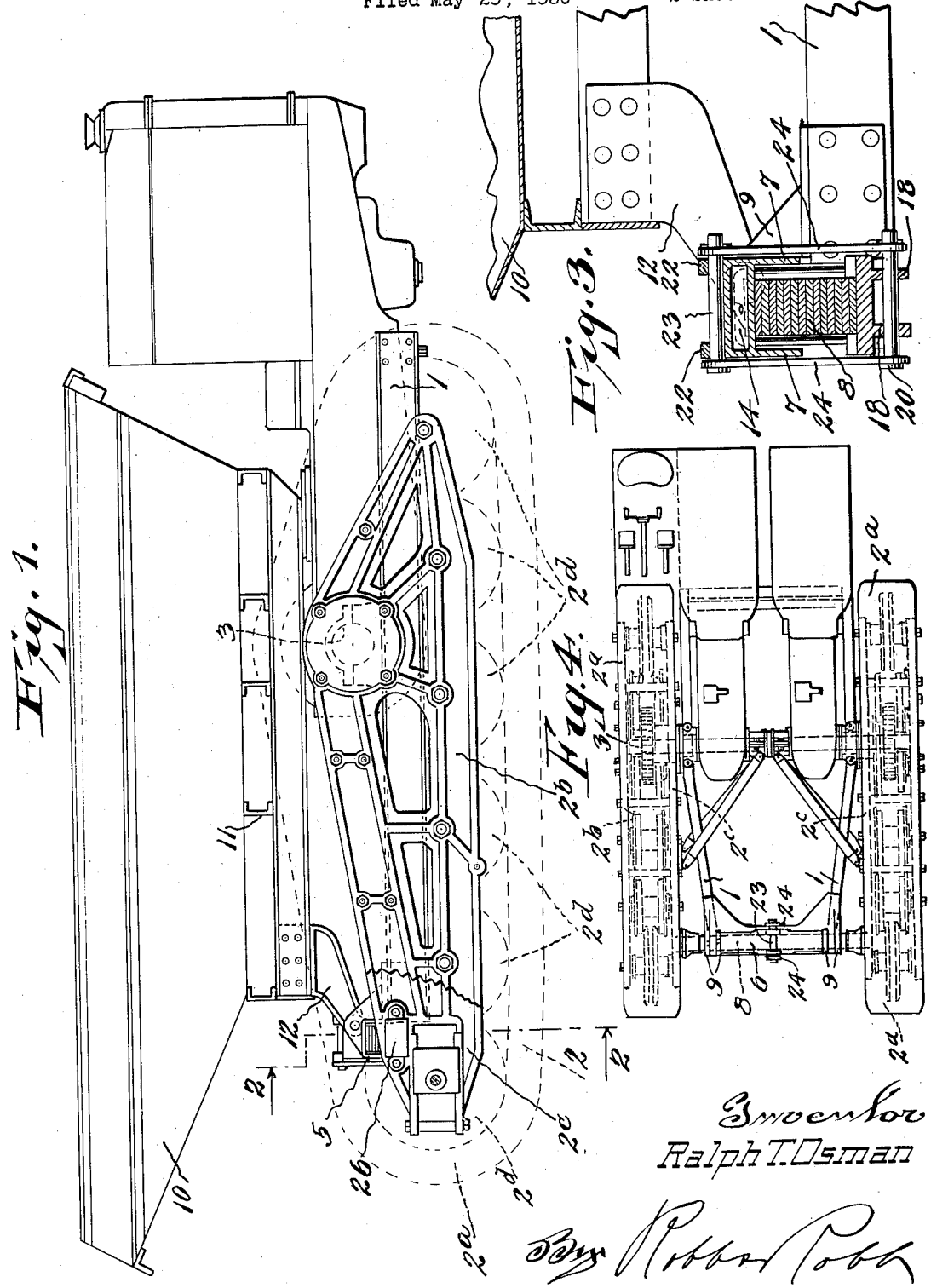
Inventor
Ralph T. Osman

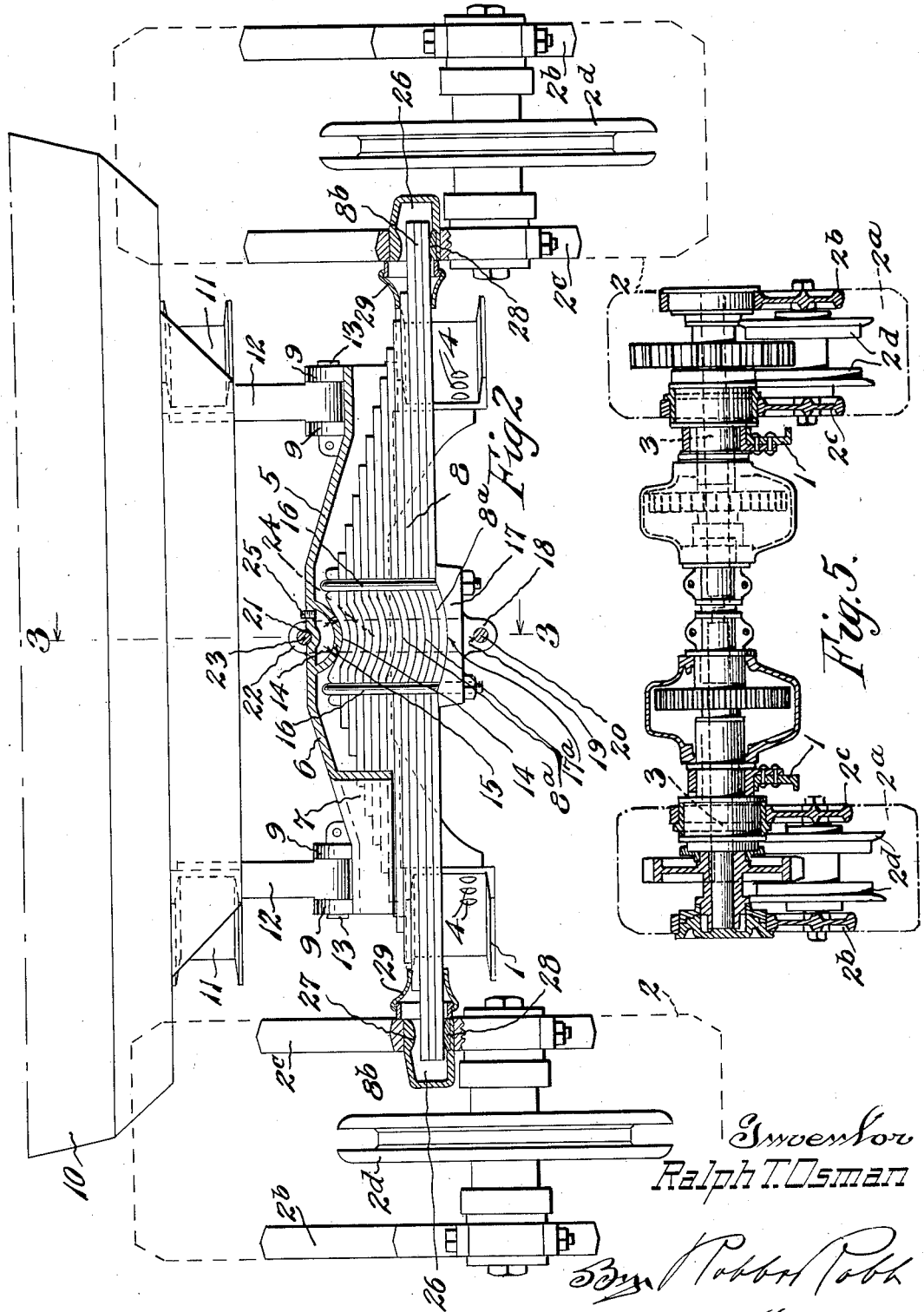

Patented Aug. 1, 1933

1,920,661

UNITED STATES PATENT OFFICE 1,920,661

SPRING SUSPENSION

Ralph T. Osman, Milwaukee, Wis., assignor to Koehring Company, Milwaukee, Wis., a Corporation Application May 29, 1930. Serial No. 457,214

11 Claims. (Cl. 280—106.5)

In traction vehicles employing a supporting frame on which a dump body is mounted, such for example, as the type of vehicle illustrated in the copending application of R. T. Osman, Serial No. 456,417, filed May 28th, 1930, now Patent Number 1,865,133, adapted for elevation to dump the contents thereof and for utilizing the end of the dump body for bulldozing or dirt strike-off purposes wherein the supporting frame is pivotally carried on a pair of independently movable traction devices or crawler members, it is highly desirable to provide a resilient yieldable support between the main supporting frame and the traction devices and provide the supporting means so as to equalize the relative movement between the traction devices incident to unevenness of the ground over which the vehicle may be operated, as well as to provide means for absorbing the shocks between the front ends of the traction devices and the front of the main frame incident to vertical movement of the traction devices.

An object of my invention is to provide the vehicle frame especially adapted for the previously referred to purposes in which the supporting frame for the dump body is provided intermediate its ends with means for pivotally mounting the crawler frames, these crawler frames being supported on the main frame for rotation intermediate their ends at a single point for oscillation in substantially vertical planes parallel with respect to the main supporting frame. I preferably desire to mount the dump body on the main frame substantially to one side of the pivotal connection between the crawler frames and the main frame and arrange the engines or power plants at the opposite side of its central support or pivot, whereby the disposition of the weight of the dump body and its contents has a tendency to be counterbalanced by the weight of the engine, and my arrangement of the location of the pivotal connection of the crawler frames intermediate their ends is such that the crawler devices extend a substantial distance on either side of the pivotal center referred to to provide a substantial traction support for the vehicle. In order to support the forward end of the main frame for flexible yielding engagement with respect to the traction devices carried by the crawler frames and to permit relative independent movement of the traction devices, I dispose on the main frame a spring suspension means which carries a transverse spring engaging the free ends of the crawler frames. This spring is free to oscillate within certain limits to permit the above referred to independent oscillation of the crawler frames with respect to the main frame.

To this end I have devised an improved type of spring suspension connecting the front ends of the crawler frames with the main frame supporting the dump body which consists of a combined transverse spring housing cross frame member and pivotal mounting for the dump body, the transverse spring housing constituting means for pivotally mounting a leaf spring intermediate its ends therein in such a manner that the housing will protect the spring member and permit limited oscillation of the spring around its pivotal center and upon abnormal movement of the spring the housing will become effective to limit said movement.

Another object of my invention is to provide an improved connection between the ends of the spring member and the crawler frames to provide for a relative sliding movement therebetween and also provide a chamber in which lubricant may be contained to supply the contacting members with the necessary lubrication.

A further object of my invention is to provide the combined spring housing with a hollow bearing member which may also be adapted to supply lubricant to the central contacting parts between the spring and the bearing member.

Other and further objects and advantages of my invention will hereinafter become apparent as the description of the invention proceeds.

For a full and more complete understanding of the invention, reference may be had to the following description and accompanying drawings, in which—

Figure 1 is a side elevation of an improved type of dirt hauling and dumping unit, having my invention applied thereto, the endless traction belt and tumblers being shown in dotted lines.

Figure 2 is a section taken approximately on the line 2—2 of Figure 1.

Figure 3 is an enlarged fragmentary detail view taken on the line 3—3 of Figure 2.

Figure 4 is a diagrammatic plan view of my vehicle having the dump body removed therefrom.

Figure 5 is a section of the drive unit.

Throughout the various figures of the drawings and following description, like reference characters denote corresponding parts, in which the main frame 1 is provided with traction members 2 carried with respect thereto in a floating or vertically oscillatable manner on pivotal connections or shafts 3. These shafts are also adapted to drive the traction belts 2a in any suitable manner and may be supplied with sprocket members which directly engage the belts. The traction members 2 comprise spaced frame members 2b and 2c in which are rotatably carried the idler wheels or tumblers 2d for supporting the tread or belt member 2a. The shafts 3 and associated parts constitute a driving unit which is operated by suitable drive gearing upon twin engines carried by the rear end of the main frame 1.

The front end of the main frame 1 has secured thereto by rivets or any other securing means 4, my improved spring suspension means indicated generally at 5. The suspension means includes an inverted U-shaped channel member 6 having its side walls extending downwardly as indicated at 7 to provide a housing for the resilient leaf spring 8. The U-shaped channel member 6 has formed thereon at each end the brackets 9 for pivotally supporting the dump body 10. The dump body 10 is carried by a fabricated frame 11 from which extend the arms 12. These arms are apertured and are received between the brackets 9 and are held in pivotal relation thereto by the pins 13. The channel member 6 extends upwardly intermediate the ends thereof and has disposed at the central portion a hollow spring supporting bearing 14. The spring which is used in connection with this housing is provided with a curved bearing member as indicated at 15, which is held in place by the U-bolts 16. These U-bolts are received in the spring clip 17 having a downwardly extending central portion 18, which is apertured at 19 to receive the pin 20. The transverse channel member is provided on its upper surface with a transverse groove 21 and a pair of spaced apertured ears 22 for receiving a pin 23. Link members 24 are disposed between the pins 23 and 20 to maintain the spring in proper operative relation and at the same time provide for the relative swinging movement of the spring on its bearing member 15.

The bearing member 15 is of course provided with an opening 25 through which lubricant can be introduced and suitable means for closing the opening are provided such as shown in Figure 2. The surface of the spring clip which engages the spring is curved as at 17a to accommodate the curved or bent portion 8a of the spring 8. Likewise the curved bearing member 15 is provided with the proper curvature on the side opposite the bearing portion 14 of the transverse housing. Since the intermediate leaves of the spring are all curved on substantially the same center, it will be clearly seen that once the spring is assembled between the bearing member 15, and the clip 17, and the U-bolts 16 are tightened, the peculiar formation of the leaves of the spring will prevent any relative shifting thereof. Furthermore, it will be observed that the spring will be freely movable around the bearing member 15, limited of course by the top of the inverted channel member 6, and it will also be observed that the link members 24 will support the spring in proper relation to the bearing member 15.

In order to provide a suitable compensating bearing for the free ends 8b of the springs 8, I provide the housings 26 suitably positioned in the frame members 2c of the traction devices 2. These housings are closed at their outer end and are provided with bearing members 27, 28 disposed above and below the spring. The bearing member 28 may be separately formed and adapted for removal or replacement as seen in Figure 2, while the bearing member 27, due to the fact that it is operative only on abnormal movements of the traction members, does not require the above referred to replacement as often as the other bearing member, and for this reason it is not shown to be of the removable character. The inner end of the spring end housing is preferably closed by the flexible boot 29 which is connected thereto at one end and secured to the spring 8 at the other.

Referring to Figure 2 of the drawings, it will be observed that the spring member 8 permits an equalizing action to occur between the two traction devices 2 and it will also be observed that the spring member permits independent vertical movement of the traction devices with respect to each other and with respect to the body. It should also be observed that upon abnormal movement of the traction devices the spring will engage the housing 5, thereby shortening the lever arm of the spring to retard such abnormal movement.

It will also be noted that due to the peculiar housing of the spring within the inverted channel member, the spring is amply protected from becoming clogged with dirt and grit during the use of the dirt handling unit.

Referring to Figures 1 and 2 of the drawings, it will be seen that the crawler frames are substantially triangular in form and the pivotal connection thereof with the main frame as indicated at 3 is disposed intermediate the ends thereof and above the plane extending between the two ends of the crawler frame. It will also be observed that this pivotal connection is disposed on the main frame 1 intermediate the ends thereof and at substantially the center of the main frame, while the dump body 10 pivotally carried by the brackets 12 on the main frame is disposed materially to one side of the pivotal connection 3, whereas the engine or power plant is disposed at the other side of the pivotal support above referred to.

Since each of the traction devices indicated generally at 2 oscillates with the connection referred to as a center, it should be observed that when the truck is loaded, the majority of the weight of the vehicle and the load is concentrated on this pivotal center, which of course permits a high degree of flexibility of the traction devices with respect to each other and the supporting frame. This arrangement makes it possible to utilize a three-point suspension for the main frame in which the pivotal center of the transverse spring member constitutes one point and the pivotal centers of the traction devices constitute the other two points, wherein the spring member is not necessarily loaded, permitting the use of a relatively flexible leaf spring by which rocking of the main frame in either direction may be arrested.

Having thus described my invention, what I claim as new and desire to secure by Letters Patent of the United States, is—

1. In a vehicle of the class described, a main frame, a pair of endless belt supporting traction frames pivoted adjacent one end to the main frame, a U-shaped inverted transverse channel member secured to the main frame at one end and provided with a hollow bearing member adapted to receive a lubricant, a spring pivotally carried with respect to said bearing member and housed by said housing, said spring extending into said traction frames, and bearing members carried by said traction frames for engaging the ends of the spring.

2. In a dirt handling vehicle of the class described, a main frame including a pair of spaced channels, a pair of traction devices pivotally secured to said main frame and extending longitudinally thereof, a combined transverse member and spring housing channel disposed at the ends of the main frame to form a connection therebetween, said spring housing having a bearing centrally thereof, and a spring member within said housing mounted for free limited oscillation on said bearing, and supporting means carried by the traction member for slidable engagement with the ends of the spring.

3. A combined transverse spring housing and cross frame member for vehicles of the class described, said cross frame member being provided with an inverted channel portion adapted to receive a leaf spring, the sides of said channel extending downwardly to partially enclose the spring, said channel portion having a curved bearing member disposed centrally thereof, around which the spring, when positioned in the housing, is adapted to rock, and means on the channel member and arranged concentric with respect to the curved surface of the bearing portion to constitute a pivotal center for the spring referred to.

4. In a vehicle of the class described, a main frame including a pair of spaced longitudinal channel members, crawler frames pivotally disposed adjacent the longitudinal channel members for independent rocking movement with respect thereto, a combined transverse spring housing and cross frame member connecting the ends of the frame channel, said transverse spring housing including an inverted spring receiving channel having a curved central bearing, a spring positioned therein, the side walls of the channels extending downwardly to partially enclose a spring positioned therein, means disposed on the exterior of the channel member at the center of curvature of the bearing portion to establish a pivotal center of oscillation of said spring, said leaf spring having a bearing portion arranged to engage the bearing portion on the transverse frame, and a pair of links connecting the spring with the transverse housing at said established pivotal center.

5. In a vehicle of the class described, a main frame including a pair of spaced longitudinal channel members, crawler frames pivotally disposed adjacent the longitudinal channel members for independent rocking movement with respect thereto, a combined transverse spring housing and cross frame member connecting the ends of the frame channels, said transverse spring housing being in the form of an inverted spring receiving channel having a curved central bearing, a spring positioned within said housing, the side walls of the channel extending downwardly to partially enclose said spring, means disposed on the exterior of the channel member at the center of curvature of the bearing portion to establish a pivotal center of oscillation of the spring, said leaf spring having a bearing portion arranged to engage the bearing portion on the transverse frame, a pair of links connecting the spring with the transverse housing at the above referred to pivotal center, and removable bearing members carried by the traction devices for engaging and enclosing the free ends of the spring to provide a slidable engagement therebetween.

6. In a spring suspension for vehicles, a main frame, crawler frames supported in the main frame for rotating intermediate their ends at a single point for oscillation in substantially vertical planes parallel to the main frame, a transverse frame member carried by the main frame, a hollow rocker bearing carried by the transverse frame, a leaf spring supported thereon in oscillating relation thereto, said leaf spring having a bearing surface thereon, said hollow rocker bearing being formed with a passage to establish communication between the hollow portion of the bearing member and the bearing surface for the spring whereby to feed a lubricant when introduced into the hollow portion to the bearing surface for the spring, said hollow portion being provided with means for introducing a lubricant into the hollow portion, the frame member forming a housing for the spring.

7. In a spring suspension for vehicles, having a main frame, a transverse frame member carried by the main frame, spaced traction devices pivotally secured to the main frame adjacent each end of the same and extending longitudinally thereof, a transverse bearing and spring housing member extending between the two traction devices and having a supporting bearing arranged centrally thereof for rocking engagement with the transverse frame member, a hollow bearing carried by the frame member for engagement with the bearing portion of the transverse bearing member, means for supplying lubricant to the central bearing surfaces, and a leaf spring positioned in the housing member and pivotally carried thereby, the spring having its ends extending into the traction devices, the said spring being free to oscillate to allow independent oscillation of the traction devices.

8. In a vehicle of the class described, in combination, a main frame, a pair of independently shiftable traction members pivoted to the main frame intermediate the ends thereof, a transverse frame member connecting the ends of the main frame together, the transverse frame member constituting a spring housing and a spring member within the housing engaging the traction devices and the housing, and means for pivotally mounting the traction members on the main frame to allow independent vertical oscillation of the traction members.

9. In a vehicle of the class described, a main frame, a pair of traction members pivotally carried by the main frame for independent oscillation thereon, a transverse channel member secured to the end of the main frame, the said channel member forming a spring housing, a spring between the traction devices and the housing, the spring being shiftable with respect to the housing and the traction members, and instrumentalities allowing independent oscillation of the traction members.

10. In a vehicle of the class described, in combination, a main frame and a pair of independently shiftable traction members pivoted to the main frame intermediate the ends thereof, a transverse frame member connecting the ends of the main frame together, the said transverse frame member constituting a spring housing and adapted to have pivotally secured thereto a truck body adapted to be carried by the main frame, and a spring member within the said housing engaging the traction devices and the said housing.

11. In a vehicle of the class described, a main frame, a pair of traction members pivotally carried by the main frame for independent oscillation thereon, the main frame being adapted to support a vehicle body at one end of the latter, a transverse channel member secured to the end of the main frame and adapted to be pivoted to the vehicle body when the latter is mounted on the main frame, the channel member forming a spring housing, and a spring between the traction devices and the housing, the said spring being shiftable with respect to the housing and the traction members.

RALPH T. OSMAN.